US008073116B2

(12) United States Patent
Rogers

(10) Patent No.: US 8,073,116 B2
(45) Date of Patent: Dec. 6, 2011

(54) INTERACTIVE HANDLING OF DISPUTES

(75) Inventor: Kerry S. Rogers, Dacula, GA (US)

(73) Assignee: AT&T Intellectual Property I. L.P., Reno, NV (US)

( * ) Notice: Subject to any disclaimer, the term of this patent is extended or adjusted under 35 U.S.C. 154(b) by 1373 days.

(21) Appl. No.: 11/619,319

(22) Filed: Jan. 3, 2007

(65) Prior Publication Data

US 2008/0162368 A1 Jul. 3, 2008

(51) Int. Cl.
*H04M 15/00* (2006.01)
(52) U.S. Cl. .................... 379/114.03; 705/80
(58) Field of Classification Search ............. 379/93.12, 379/114.03, 114.04, 121.04, 121.05; 705/80, 705/1.1, 309, 30
See application file for complete search history.

(56) References Cited

U.S. PATENT DOCUMENTS

| | | | |
|---|---|---|---|
| 5,987,110 A | 11/1999 | Malik et al. | |
| 6,141,653 A | 10/2000 | Conklin et al. | |
| 6,199,050 B1 | 3/2001 | Alaia et al. | |
| 6,222,535 B1 | 4/2001 | Hurd, II | |
| 6,496,851 B1 | 12/2002 | Morris et al. | |
| 6,519,763 B1 | 2/2003 | Kaufer et al. | |
| 6,675,127 B2 | 1/2004 | LaBlanc et al. | |
| 7,120,589 B1 | 10/2006 | Szabo et al. | |
| 7,251,607 B1 * | 7/2007 | Veschi ........................ | 705/309 |
| 2001/0037204 A1 * | 11/2001 | Horn et al. ................... | 705/1 |
| 2001/0051913 A1 | 12/2001 | Vashistha et al. | |
| 2002/0129056 A1 | 9/2002 | Conant et al. | |
| 2002/0133362 A1 * | 9/2002 | Karathanasis et al. ........... | 705/1 |
| 2002/0147604 A1 * | 10/2002 | Slate et al. ..................... | 705/1 |
| 2002/0152133 A1 * | 10/2002 | King et al. ..................... | 705/26 |
| 2003/0061330 A1 | 3/2003 | Frisco et al. | |
| 2003/0236679 A1 * | 12/2003 | Galves et al. ................... | 705/1 |
| 2004/0002885 A1 | 1/2004 | Levy | |
| 2004/0030590 A1 | 2/2004 | Swan et al. | |
| 2004/0030992 A1 | 2/2004 | Moisa et al. | |
| 2004/0128155 A1 * | 7/2004 | Vaidyanathan et al. ......... | 705/1 |
| 2004/0148234 A1 * | 7/2004 | Gonen-Friedman et al. ... | 705/30 |
| 2004/0267559 A1 * | 12/2004 | Hinderer et al. ................ | 705/1 |
| 2005/0125340 A1 * | 6/2005 | Lin et al. ...................... | 705/39 |
| 2006/0031177 A1 * | 2/2006 | Rule .............................. | 705/80 |
| 2007/0288292 A1 | 12/2007 | Gauger | |

(Continued)

OTHER PUBLICATIONS

Atchison; Final Office Action mailed Sep. 15, 2000 for U.S. Appl. No. 10/687,332, filed Oct. 16, 2003.

(Continued)

*Primary Examiner* — Olisa Anwah
(74) *Attorney, Agent, or Firm* — Thomas, Kayden, Horstemeyer & Risley, LLP

(57) ABSTRACT

Embodiments of a method for handling disputed items include enabling a user to submit information regarding an item being disputed by the user in an interactive forum. The item may involve a service provided by a service provider for the user, where the information submitted by the user is network-accessible by a client machine of the service provider. The method further includes enabling the service provider to submit information regarding the item being disputed by the user in the interactive forum, where the information submitted by the service provider is network-accessible by a client machine of the user. Such a method also includes enabling a status of the item being disputed to be updated in the interactive forum as the user and the service provider are directed to take turns providing information regarding the disputed item information until a dispute is resolved. Other methods, systems, and devices are also provided.

14 Claims, 13 Drawing Sheets

U.S. PATENT DOCUMENTS

2008/0281760 A1 11/2008 Williams et al.
2010/0179913 A1* 7/2010 Royer et al. .................. 705/309

OTHER PUBLICATIONS

Williams; Non-Final Rejection mailed May 22, 2009 for U.S. Appl. No. 11/742,037, filed Apr. 30, 2007.

Atchison; Final Rejection mailed Oct. 6, 2008 for U.S. Appl. No. 10/687,332, filed Oct. 16, 2003.

Atchison; U.S. Appl. No. 10/687,332, filed Oct. 16, 2003.

Williams; U.S. Appl. No. 11/742,037 filed, Apr. 30, 2007.

WWW.SQUISHLIST.COM; Squish-Screenshot-View/Edit Issue—Mocrosoft Internet Explorer; web adddress; http://www.squishlist.com/screens/issue.html; publicly available before Oct. 16, 2003, 2 pages.

WWW.PROJECTINSIGHT.COM; "Secure Login", Microsoft Internet Explorer http://www.projectinsight.net/WebsiteTourLogin.aspx, publicly available before Oct. 16, 2003, 3 pages.

WWW.SOURCEACTION.COM; "Welcome to Source Action", Microsoft Internet Explorer, web address, http://www.soruceaction.com/info/demo/images/bit_issues_list_gif, publicly available before Oct. 16, 2003, 4 pages.

WWW.TRACKSTUDIO.COM; "Why Track Studio?", The Advantages of Hierarchical Issue Tracking/Products, printed Sep. 15, 2003, 8 pages.

WWW.ISSUETRAK.COM; Issue Tracking: Finallly..an easy-to-use, Web-Basted Issue Tracking Solution; printed Sep. 15, 2003, 3 pages.

ISSUETRAK; "Issue Trak", Promtional material, Web-based Tracking System, publicly available before Oct. 16, 2003, 4 pages.

WWW.TASKCOMPLETE.COM; "Features", http://www.taskcomplete.com/index.php?X1-c1588bcY1VCSiUzRFNybmdoZXJmJtl2, publicly available before Oct. 16, 2003, 4 pages.

VERTABASE PRC; "Vertabase Pro—Project Management made easy", Product Overview, printed 3rd Quarter 2003, 8 pages.

WWW.ACEPROJECT.COM; "Multiple user & project management, task defect buy tracking, security, statistic, report, etc.,", http:///www.aceproject.com/features.htm, printed Sep. 15, 2003, 4 pages.

TENROX; "Eliminate the Unexpected",Tenrox Incident Management, Release 7, The Enterprise Optimization Company, publicly available before Oct. 16, 2003, 8 pages.

Atchison; Final Office Action mailed Oct. 12, 2010 for U.S. Appl. No. 10/687,332, filed Oct. 16, 2003.

Atchison; NFOA mailed Mar. 26, 2010 for U.S. Appl. No. 10/687,332, filed Oct. 16, 2003.

Atchison, Advisory Action mailed Jan. 28, 2009for U.S. Appl. No. 10/687,332, filed Oct. 16, 2003.

Atchison, Non-Final Rejection mailed Mar. 16, 2009 for U.S. Appl. No. 10/687,332, filed Oct. 16, 2003.

Williams; Final Office Action mailed Nov. 24, 2009 for U.S. Appl. No. 11/742,037, filed Apr. 30, 2007.

Williams; Interview Summary mailed Aug. 20, 2009 for U.S. Appl. No. 11/742,037, filed Apr. 30, 2007.

Atchison; Interview Summary mailed Jun. 23, 2009 for U.S. Appl. No. 10/687,332, filed Oct. 16, 2003.

* cited by examiner

FIG. 9

INTERACTIVE HANDLING OF DISPUTES

TECHNICAL FIELD

The present disclosure is generally related to network communications and interactive handling of disputes.

BACKGROUND

In handling a service for a customer, a dispute may arise between the customer and a service provider. For example, a customer may disagree with how a service has been billed to the customer by the service provider. To handle such disputes, the service provider may have a billing dispute process. In one such process, a customer submits a dispute via an email with attachment(s) that include printed copies of a bill, spreadsheet files, or other data files that are sent to the service provider (e.g., perhaps to a specific dispute mailbox). In handling the dispute, representatives of the service provider may end up having multiple versions of the same communication being sent amongst each other with different information, different statuses, misplaced information, etc. This type of process causes many problems such as duplicate disputes, lost and skewed data, and not having a way to measure time to completion of the dispute. Therefore, trying to manage and maintain a dispute becomes problematic for both the service provider and customer.

Thus, a heretofore unaddressed need exists in the industry to address the aforementioned deficiencies and inadequacies.

SUMMARY

Embodiments of a method for handling disputed items include enabling a user to submit information regarding an item being disputed by the user in an interactive forum. The item may involve a service provided by a service provider for the user, where the information submitted by the user is network-accessible by a client machine of the service provider. The method further includes enabling the service provider to submit information regarding the item being disputed by the user in the interactive forum, where the information submitted by the service provider is network-accessible by a client machine of the user. Such a method also includes enabling a status of the item being disputed to be updated in the interactive forum as the user and the service provider are directed to take turns providing information regarding the disputed item information until a dispute is resolved.

Embodiments of the present disclosure also include a system for handling disputed items. The system has an interactive forum enabling a user to submit information regarding an item being disputed by the user in the interactive forum. The disputed item involves a service provided by a service provider for the user. The information submitted by the user is network-accessible by a client machine of the service provider. The interactive forum further enables the service provider to submit information regarding the item being disputed by the user in the interactive forum, where the information submitted by the service provider is network-accessible by a client machine of the user. Also, the interactive forum enables a status of the item being disputed to be updated in the interactive forum as the user and the service provider are directed to take turns providing information regarding the disputed item information until a dispute is resolved. The system further includes at least one database storing the information provided by the user and the service provider.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 8-10 are screenshot diagrams of an exemplary web interface to the interactive dispute forum system of FIG. 4 displaying a web page of a billing dispute provided by a customer.

DETAILED DESCRIPTION

Figure 1:
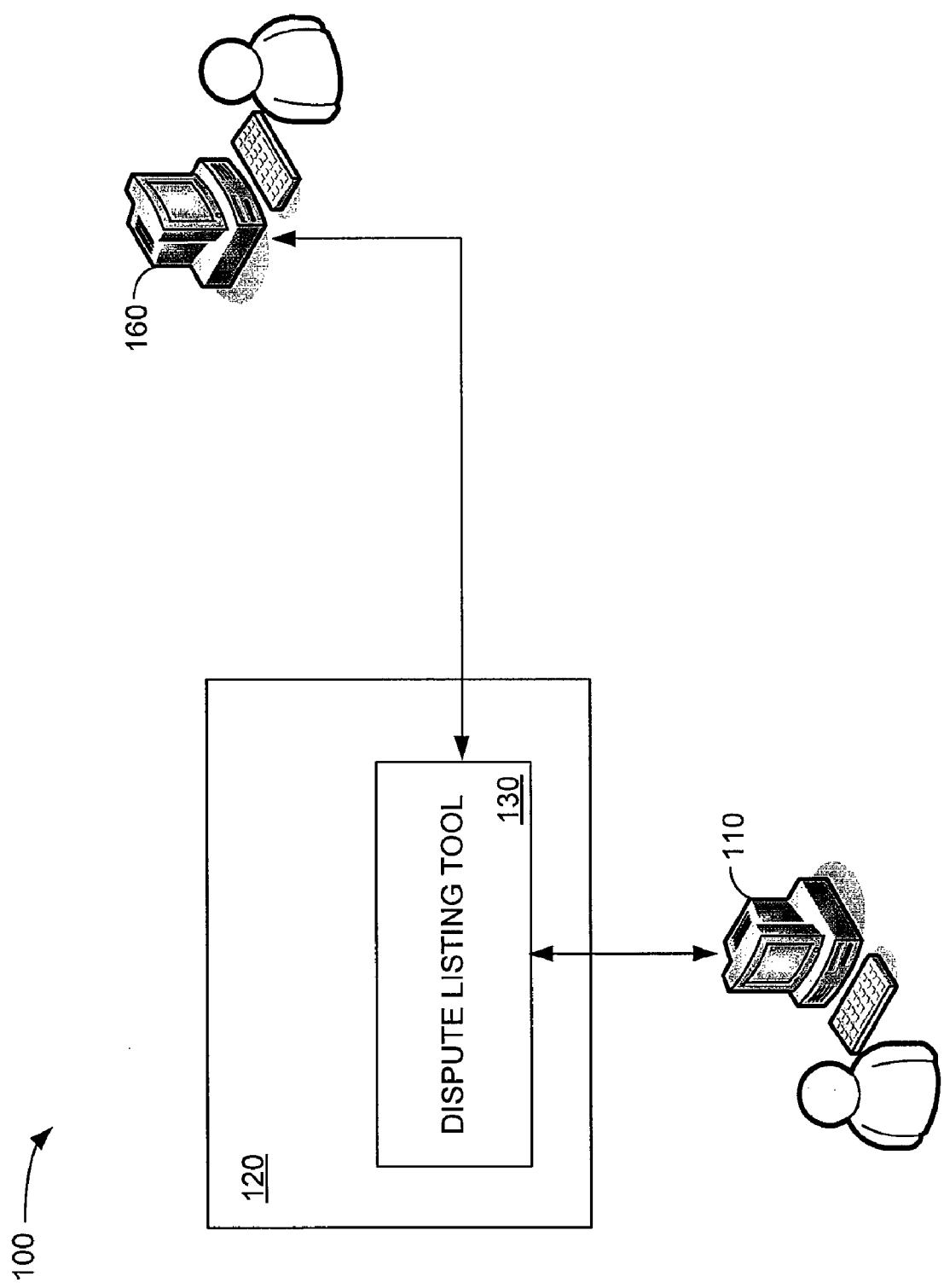
FIG. 1 is a block diagram of an embodiment of a dispute handling system.

Referring to FIG. 1, one embodiment of a dispute handling system 100 is shown. According to an exemplary embodiment, the dispute handling system facilitates interaction and handling of billing disputes between a service provider and their customers. While the description that follows is directed to a billing dispute system for a telecommunications provider for simplicity of explanation, it should be appreciated that exemplary embodiments may also be applicable to general disputes involving any service provider. Generally, a service may be regarded as work performed by a person or business for another person or customer at an agreed upon fee (hourly rate, flat fee, etc.). Often, a dispute may arise with regard to the service being performed or an ancillary issue involving the service, such as a billing dispute for the service.

In on example, a customer may receive a bill from a service provider. In reviewing the bill, the customer notices something in the bill that does not make sense to the customer. The customer then sends the bill via a dispute handling system 100 (FIG. 1.) to the service provider to identify whether an item has been billed correctly or has not been billed correctly. Additional information may be sent by the customer as evidence of an incorrect billing. The service provider investigates the matter and communicates back to the customer with their findings. The service provider informs the customer whether the billing was correct or incorrect based on the information provided by the customer. If the service provider does not have enough information from the customer, the service provider may request additional information from the customer via the dispute handling system 100. When the customer is correct and there is an improper billing, the service provider corrects the billing error and provides the customer a record that the error has been corrected.

Use of the dispute handling system 100 of the present disclosure helps simplify the billing dispute resolution process to the benefit of consumers and service providers, such as businesses.

Within one embodiment, among others, of a dispute handling system 100, a customer at a client machine or device 110 accesses a dispute resolution system 120, as shown in FIG. 1. Via the dispute resolution system 120, the customer may access a dispute listing tool or module 130 that maintains a listing of currently active disputes for services offered by a service provider. Via the dispute listing tool 130, the customer may create a new dispute listing or review/modify a pre-existing dispute listing for the customer. A representative of the service provider from a client machine or device 160 may access the dispute handling tool 120 to review a customer's dispute listing or modify contents of a customer's dispute listing.

Figure 2:
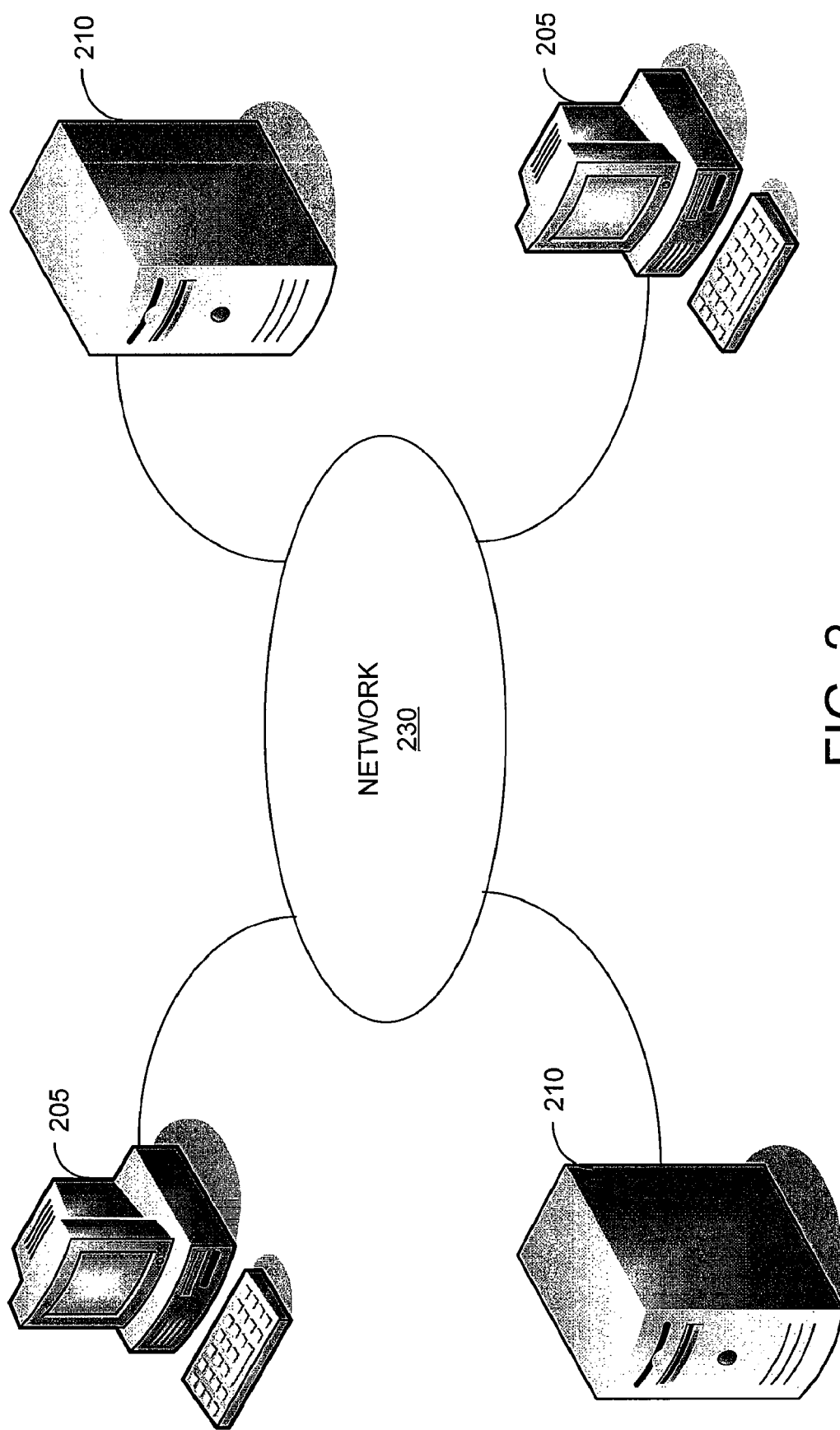
FIG. 2 is a block diagram of an embodiment of a client-server environment in which the system of FIG. 1 may be facilitated.

Next, FIG. 2 shows one embodiment, among others, of a client-server environment, such as the World Wide Web (the Web), in which the dispute handling system 100 may be facilitated. The architecture of the Web follows a client-server model. The terms "client" and "server" are used to refer to a computer's general role as a requester of data (the client) or provider of data (the server). Web clients 205 and Web servers 210 communicate using a protocol such as HyperText Transfer Protocol (HTTP). In the Web environment, Web browsers reside on clients and render Web documents (pages) served by the Web servers. The client-server model is used to communicate information between clients 205 and servers 210. Web servers 210 are coupled to the network 230 (e.g., Internet) and respond to document requests and/or other queries from Web clients 205. When a user selects a document by submitting its Uniform Resource Locator (URL), a Web browser, such as Mozilla Firefox®, Netscape Navigator®, or Internet Explorer®, opens a connection to a server 210 and initiates a request (e.g., an HTTP get) for the document. The server 210 delivers the requested document, typically in the form of a text document coded in a standard markup language such as HyperText Markup Language (HTML).

Figure 3:
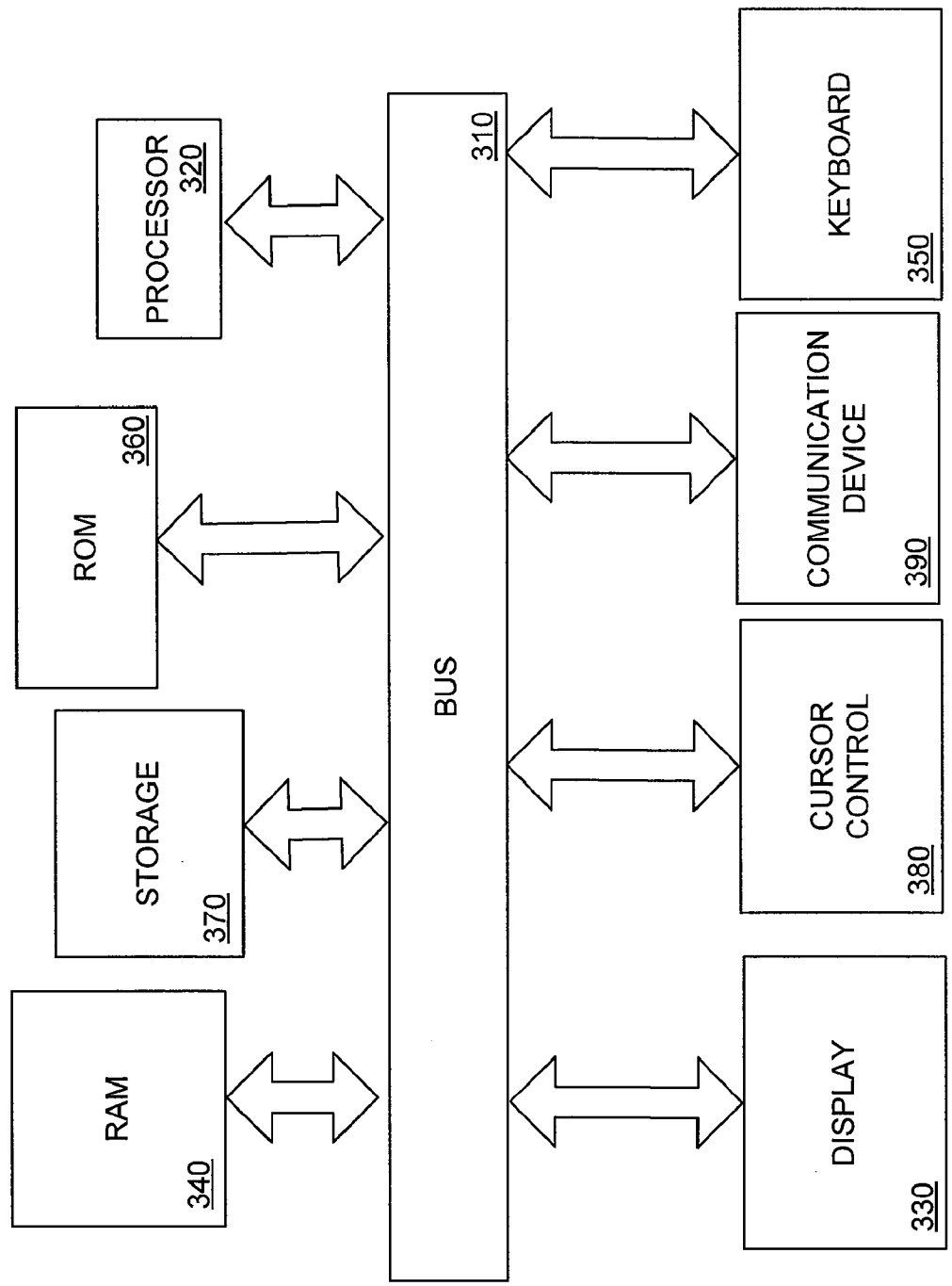
FIG. 3 is a block diagram of a computer system representing an exemplary server which may be utilized in the system of FIG. 1.

Accordingly, FIG. 3 is a computer system 300 representing an exemplary server which may be utilized in the system of FIG. 1. Computer system 300 comprises a bus or other communication means 310 for communicating information, and a processing means such as processor 320 coupled with bus 310 for processing information. Computer system 300 further comprises a random access memory (RAM) or other dynamic storage device 340 (referred to as main memory), coupled to bus 310 for storing information and instructions to be executed by processor 320. Main memory 340 also may be used for storing temporary variables or other intermediate information during execution of instructions by processor 320. Computer system 300 also comprises a read only memory (ROM) and/or other static storage device 360 coupled to bus 310 for storing static information and instructions for processor 320.

A data storage device 370 such as a magnetic disk or optical disc and its corresponding drive may also be coupled to computer system 300 for storing information and instructions. Computer system 300 can also be coupled via bus 310 to a display device 330, such as a cathode ray tube (CRT) or Liquid Crystal Display (LCD), for displaying information to a computer user. Typically, an alphanumeric input device 350 (e.g., a keyboard), including alphanumeric and other keys, may be coupled to bus 310 for communicating information and/or command selections to processor 320. Another type of user input device is cursor control 380, such as a mouse, a trackball, or cursor direction keys for communicating direction information and command selections to processor 320 and for controlling cursor movement on display 350.

A communication device 390 is also coupled to bus 310 for accessing remote servers via a network, such as the Internet, for example. The communication device 390 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

Figure 4:
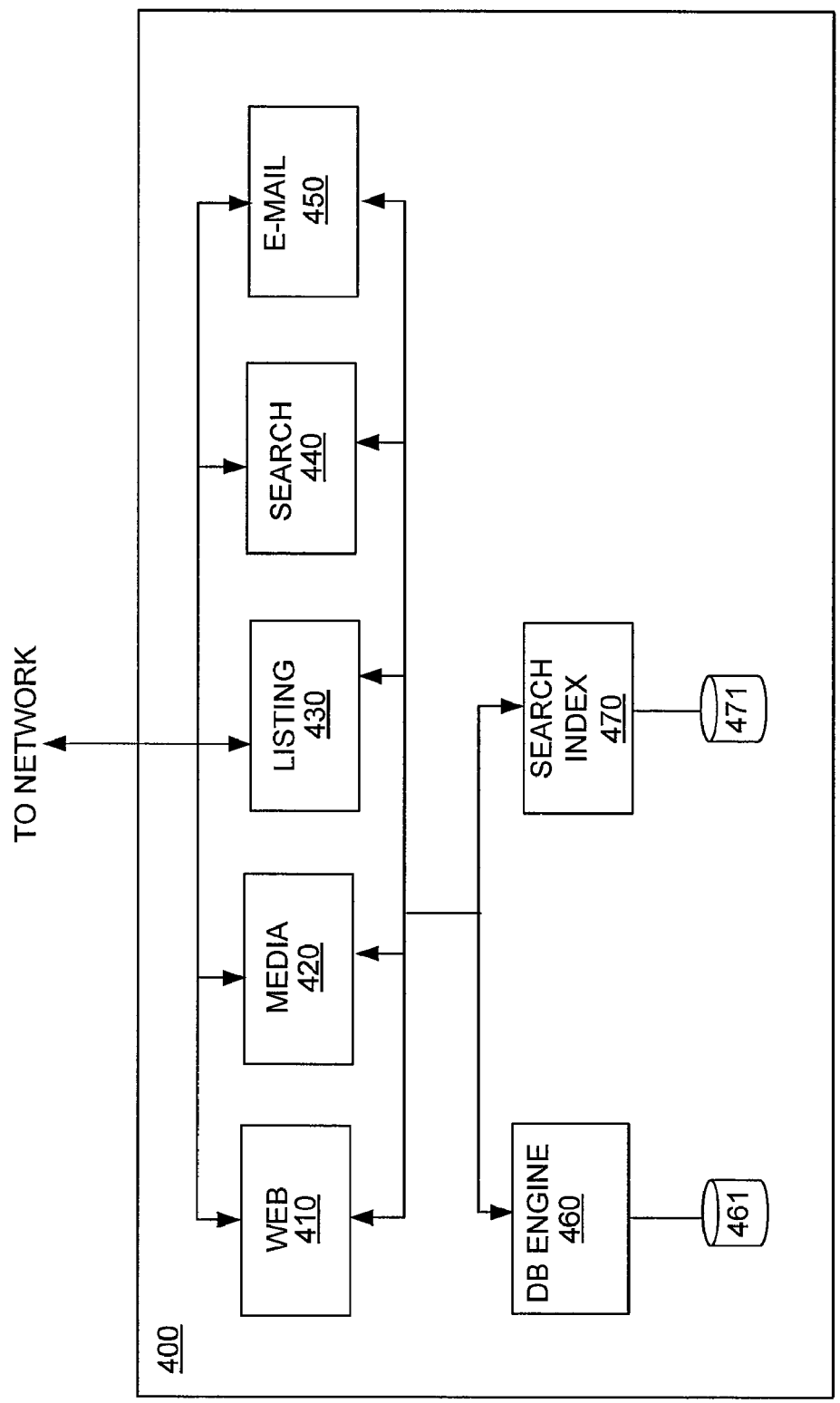
FIG. 4 is a block diagram illustrating an embodiment of an interactive dispute forum system from FIG. 1.

FIG. 4 is a block diagram illustrating one embodiment, among others, of an interactive dispute forum system 400. The interactive dispute forum system 400 includes one or more of a number of types of front-end servers, namely Web servers 410 that deliver Web pages (e.g., markup language documents), media servers 420 that dynamically deliver images and other media to be displayed within Web pages, dispute listing servers 430, and search servers 440 that handle search requests to the system 400. E-mail servers 450 provide automated e-mail communications to users of the system 400.

The back-end servers include a database engine server 460 and a search index server 470, each of which maintains and facilitates access to a respective database. Databases 461, 471 associated with the database engine server 460 and search index server 470, respectively, may include information which may be described as seller information. Such information may include a service provider's Internet address, personnel information, transaction information, and user codes and settings (e.g., username, passwords, profiles, preferences, etc.). In addition, the databases 461, 471 may include customer's information, such as business information, user codes and settings, payment information, etc. Generally, system servers and databases may maintain a collection of dispute information.

The interactive dispute forum system 400 may be accessed by a client program, such as a Web browser that executes on a client machine 110, 160, 205 and accesses the system 400 via a network 230 such as, for example, the Internet. Other examples of networks that a client may utilize to access the system 400 include a wide area network (WAN), a local area network (LAN), a wireless network (e.g., a cellular network), or the Plain Old Telephone Service (POTS) network. The client machine 110, 205 may be a personal computer, mobile telephone, personal digital assistant (PDA). In fact, the client machine 110, 205 may be any device that can communicate with the system 400 via the network 230, and is capable of executing an appropriate client program.

Customers may search databases 461, 471 for particular dispute listings that they are interested in reviewing or determining whether a dispute has already been submitted for a particular matter. This is accomplished by software that is resident on the Web servers 410, which enable browsing and searching by customers of dispute listings stored on the database. Search functions may include partial key searches, as well as the ability to select or sort items based on Boolean search criteria, such as status identifier, purchase order numbers, service identifiers, dates, etc. In addition, a clock may be shown to inform customers of the time remaining on a listing before the dispute is scheduled to be resolved or a time indicating how long the dispute has been pending.

For security reasons, the interactive dispute forum system 400 may be utilized in conjunction with a firewall or other security measure (not shown) to ensure confidentiality of sensitive information such as financial information.

The interactive dispute forum system 400 is designed to provide an interactive real time monitoring and status of a dispute and allows both parties (e.g., the customer and the service provider) to update the disputed item as needed until resolution. The interactive dispute forum system provides multiple search criteria and the ability to download data into a spreadsheet file (e.g., a MICROSOFT EXCEL file) for further investigation, processing and dispute handling. The interactive dispute forum system 400 reduces processing time of disputes and provides real time status of a disputed item to both the service provider and the disputing customer and allows the customer directly enter information into the service provider's dispute system. Advantageously, the interactive dispute forum system 400 could be used in marketing to improve customer satisfaction and improve dispute processing times.

Once the customer enters the disputed items into the system 400, the service provider 160 accesses the same web site used by the customer and reviews the disputed item. If the disputed item submission is found to be complete and valid, the service provider 160 begins investigation of the item (e.g., in various billing and internal network systems).

Figure 5:
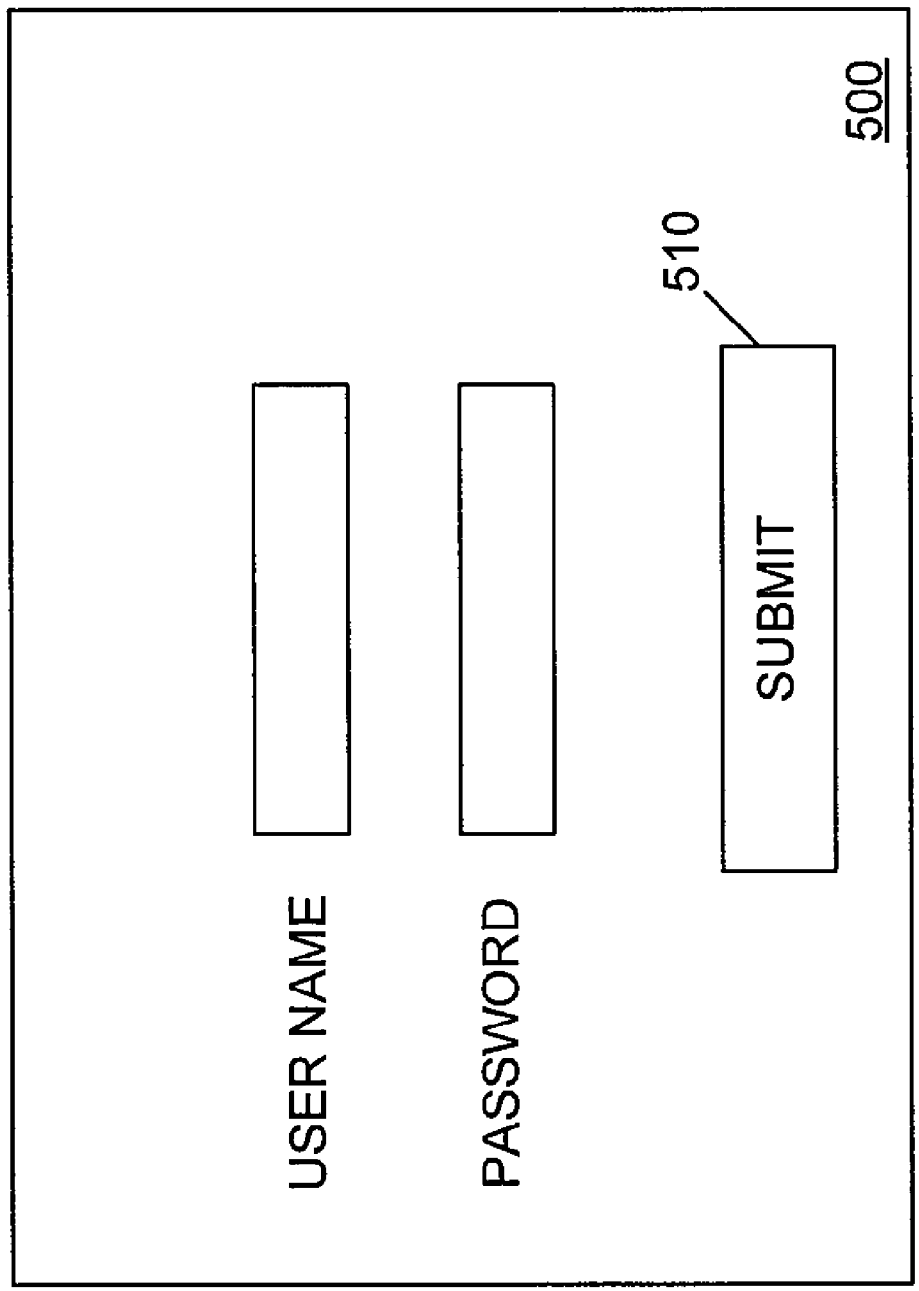
FIG. 5 is a diagram of an exemplary log-in interface for the interactive dispute forum system of FIG. 4.

A customer of a service provider that seeks to submit a dispute may register or subscribe with the interactive dispute forum system 400. Once registered, a user (either a customer or a service provider representative) can then log into the interactive dispute forum system 400. FIG. 5 shows an exemplary log-in interface 500 for the interactive dispute forum system 400. In this embodiment, the interface 500 is illustrative of a Web page that may be displayed via a Web browser on a client device 110, 160, 205. Via the interface 500, a user may enter a username and password into a login screen and select the submit button 510. Based upon the recognized username and password, Web servers 410 provide additional screens or pages to the user. For example, if a representative of the service provider logs into the system 400, specific screens maybe provided to the user that are not provided to a customer of the service provider.

The customer, via a Web browser, connects to a Web server 410 of the interactive dispute forum system 400, where the customer provides information about the billing dispute. The customer's profile information, user information, and information related to subscribed service are stored and maintained in one or more databases 461, 471. Once a customer is registered, it may then submit a dispute. To do so, the customer provides certain information about the dispute such as a description of the service at issue and the particular matter being disputed and why the customer believes there is an error.

Before a customer submits a dispute, the customer may check to see if a dispute has already been submitted for the item to prevent a duplicate dispute from being entered into the interactive dispute forum system 400. For example, more than one representative of a customer could submit a billing dispute for the same item. Therefore, in a telecommunications example, a circuit ID may be searched to determine if a dispute has already been submitted for the circuit ID. Also, in some embodiments, the representative of the service provider, in handling a dispute, checks a whole circuit for any billing errors when handling a disputed item having to do with a portion of the circuit.

Figure 6:
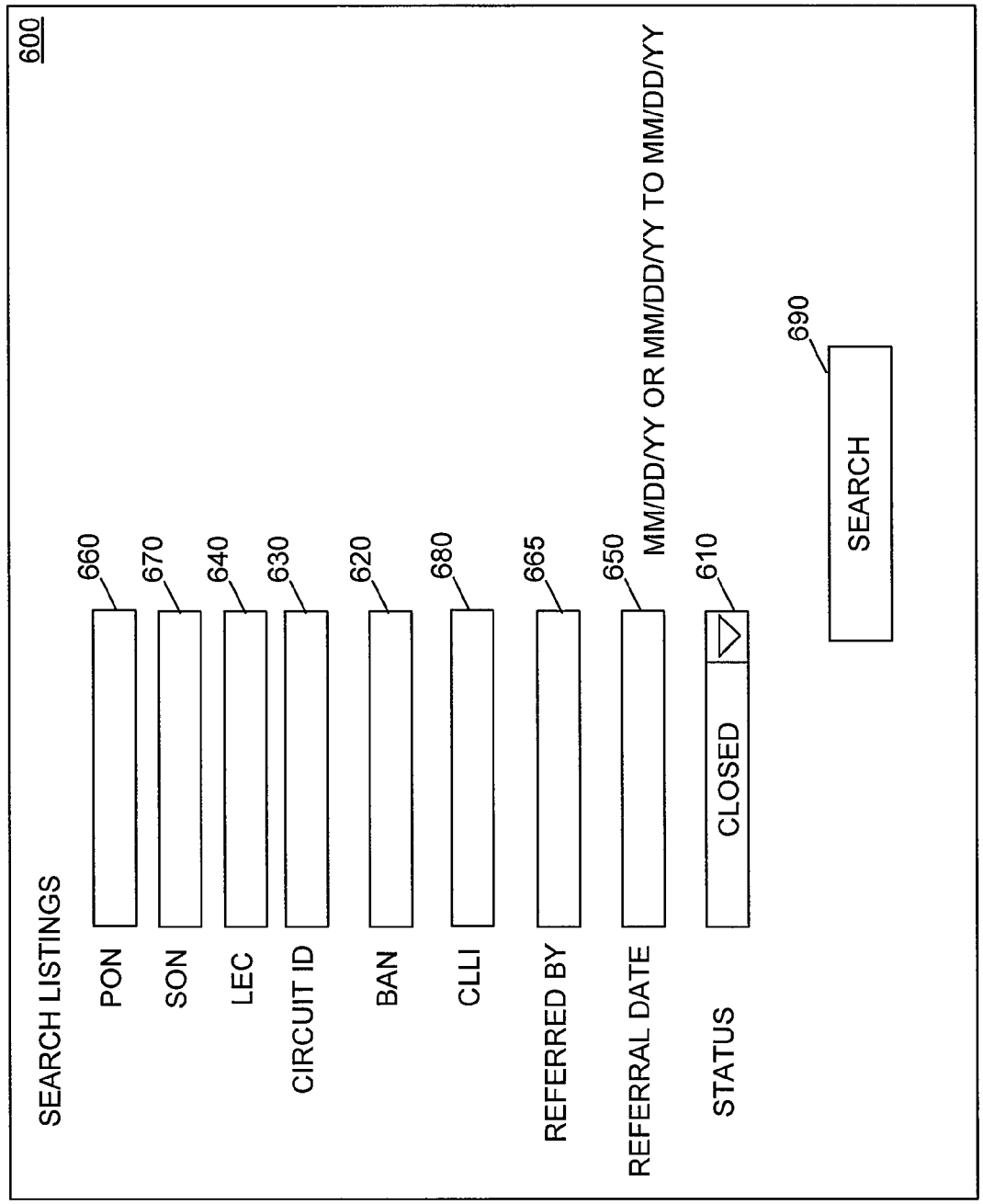
FIG. 6 is a diagram of an exemplary interface screen to the interactive dispute forum system of FIG. 4 which allows the user to select search options for sorting dispute listings.

As one example, a representative of the service provider may be shown an interface screen of FIG. 6 that allows the user to select search options for sorting dispute listings. In the example shown, the user can sort the pending dispute listings by status identifier, such as "Closed" as indicated in drop-down box 610. Also, the user can provide search terms in the input boxes, such as that for a BAN (Billing Account Number) 620, Circuit ID 630 that was the subject of the service performed by service provider for the customer, a local exchange carrier (LEC) circuit identifier (CKT ID) 640, a referral date range 650 by providing a "from date" and a "to date," a referred by term or identifier 665 identifying the person that submitted the dispute, a purchase order number (PON) 660, a service order number (SON) 670 provided by the service provider, a CLLI (common language location identifier) code 680 that identifies physical locations in a telephone network, etc. In the example shown, the user has selected that the pending dispute listings be sorted by the "Closed" status identifier. A search may then be requested by selecting the SEARCH button 690.

Accordingly, in FIG. 7, a screenshot of a web interface 700 for the interactive dispute forum 400 is shown with dispute listings such that all of the listings 720 having a "Closed" status are shown at the top of the search results 710. Additional search capabilities are provided in different embodiments to provide additional functionality as needed or desired.

Registration information provided by a customer may be stored in databases 461, 471 of the interactive dispute forum system. Via registration information, browsing and searching may be restricted to services related to the customer (e.g., a business of the customer). This may be facilitated by analyzing an assigned customer code.

Both a customer and a representative of the service provider may register with the dispute resolution system 120 and establish username and passwords for the system 120. A representative of the service provider 160, however, may be provided different privileges than a customer.

As an example, a customer based on his or her privileges may be allowed to escalate the status of a dispute item or concur with the findings of the service provider. Once an item is escalated, a system timer restarts to track the amount of time the disputed item is in this new state, but the original date in which the disputed item was created or referred is not changed, in one embodiment, among others. Further, once items are concurred, the system prevents further changes to be made to the disputed item. Based on privileges associated with the service provider or a representative of the service provider logging into the system 400, the service provider may be allowed to open an investigation and/or close the status of a disputed item but not be allowed to escalate an item from a closed status.

Figure 8:
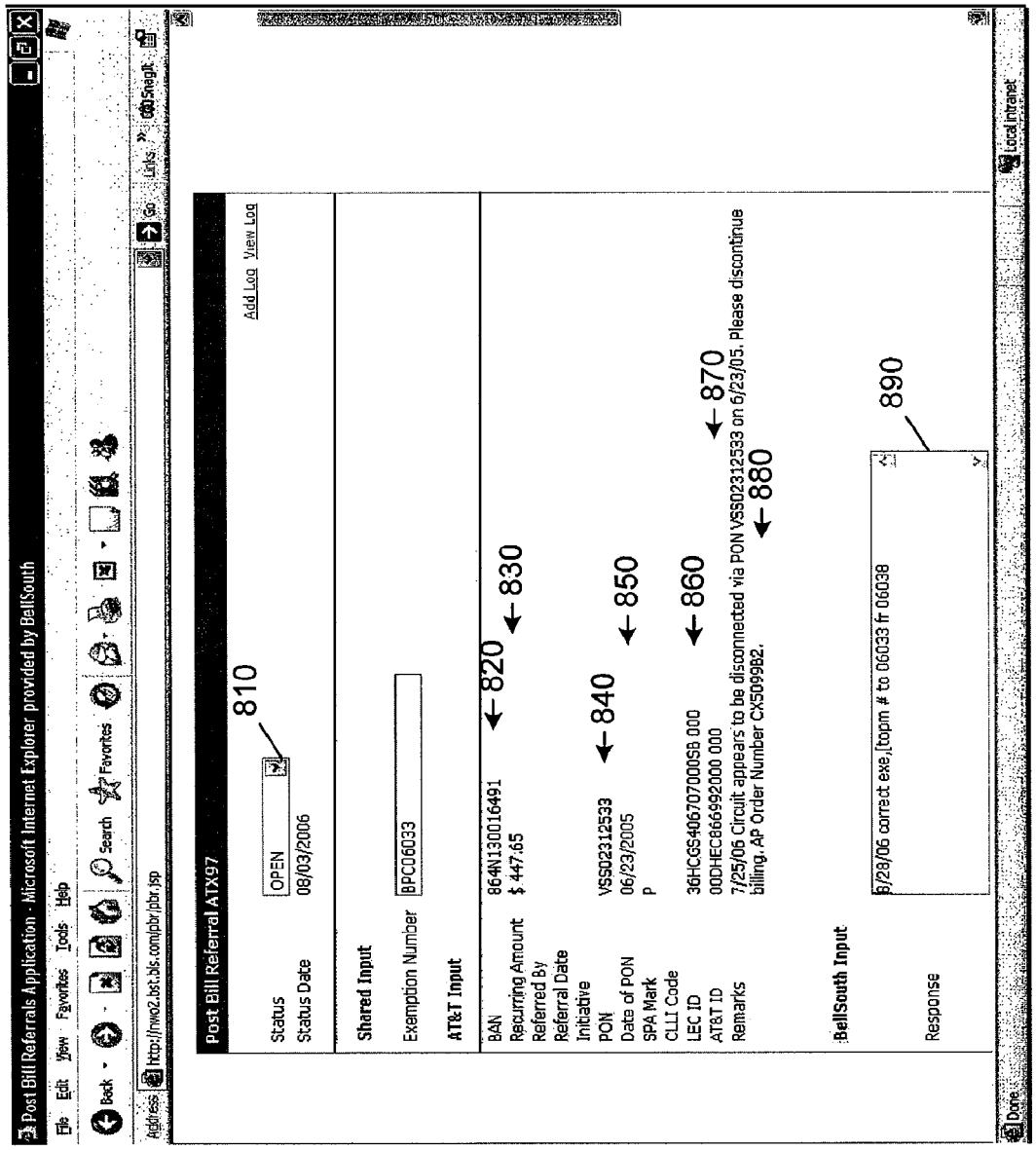
Figure 9:
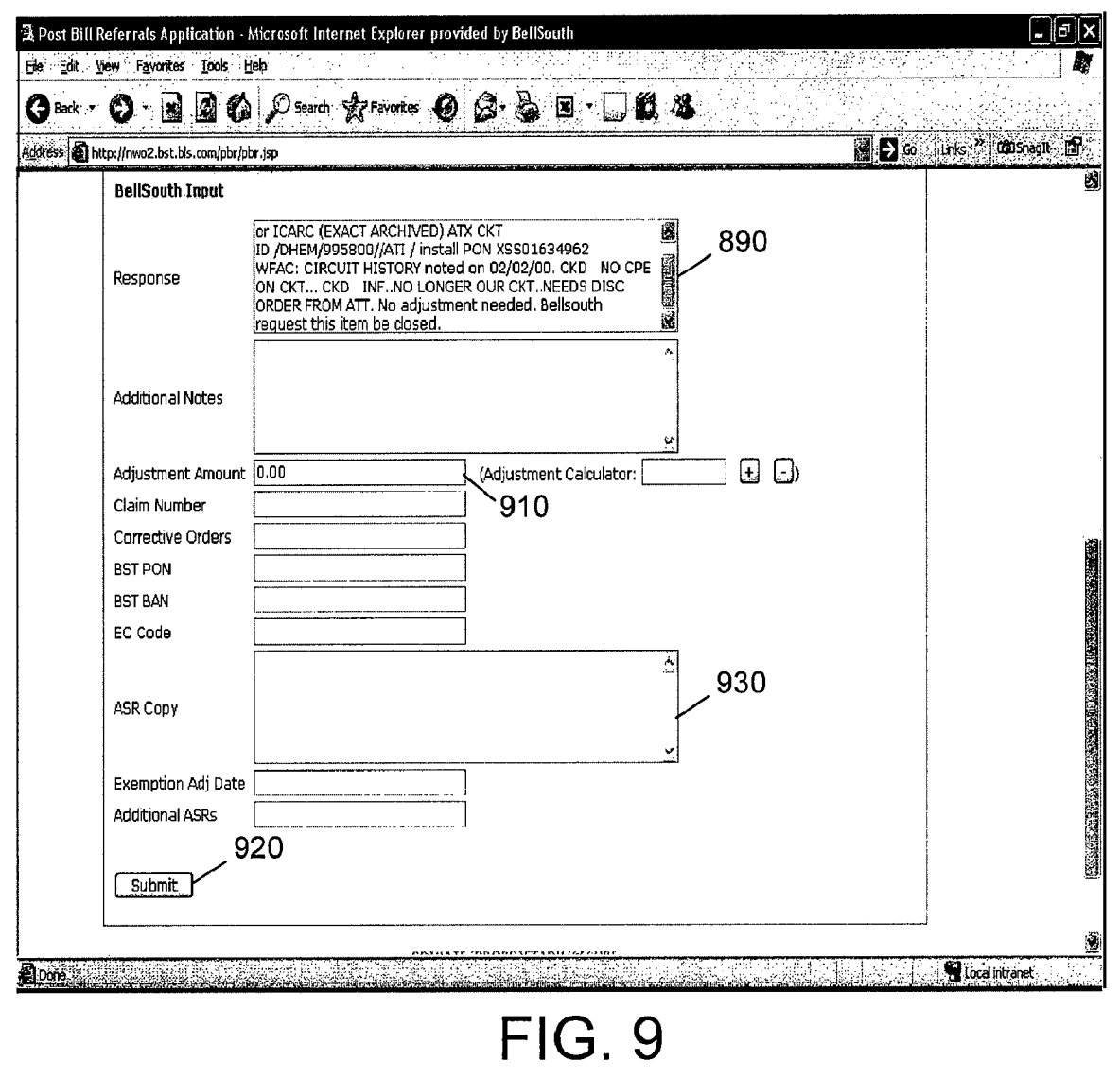

From a listing of the pending dispute items, the user can select an individual entry by clicking on the entry using a cursor and mouse control. For example, FIGS. 8-9 are screenshots of an exemplary web interface to the interactive dispute forum system 400 displaying a web page of a billing dispute provided by a customer. In the example, the dispute is in an OPEN status 810 as is under review by the service provider ("BellSouth"). The customer ("AT&T") has previously provided information regarding the disputed item. In particular, the customer has inputted the following information BAN 820, monetary amount 830 that is the subject of the dispute, PON (purchase order number) 840, date of the PON 850, LEC ID information 860, AT&T circuit ID 870, and remarks 880 which all may be useful in reviewing the disputed item. In one embodiment, the web interface may have required fields that the customer must fill out to provide sufficient detail as to allow the service provider to investigate the disputed item(s).

In reviewing the information, a representative of the service provider investigates the matter and then inputs information in a response input box 890 (which is shown in both FIGS. 8 and 9).

Referring now to FIG. 9 which shows the bottom portion of a web page that is not visible in the view provided by FIG. 8. FIG. 9 includes the remainder of the remarks provided in the response input box 890 of FIG. 8.

Here, a representative of the service provider indicates that the status of the billing dispute should be changed to closed via his or her remarks in the box 890 and that no adjustment amount is needed to be refunded or reimbursed, as shown by the 0.00 amount inputted in the Adjustment Amount box 910. Additional input boxes and mechanisms are provided and are available to a user if the user needs or desires to use them, in one embodiment among others.

Upon completion of an investigation by the service provider, a representative of the service provider is able to provide feedback from the web interface to the interactive dispute forum system. In one embodiment, contents or portion of the service request form initially provided by the customer in requesting a service can be copied (e.g., "cut and pasted") into the web interface (via a text input box 930) and provided back to the customer as record of proof of what the customer initially ordered and terms of the service agreement, for example. To submit the inputted information into the system 400, the representative may select the Submit button 920.

Figure 10:
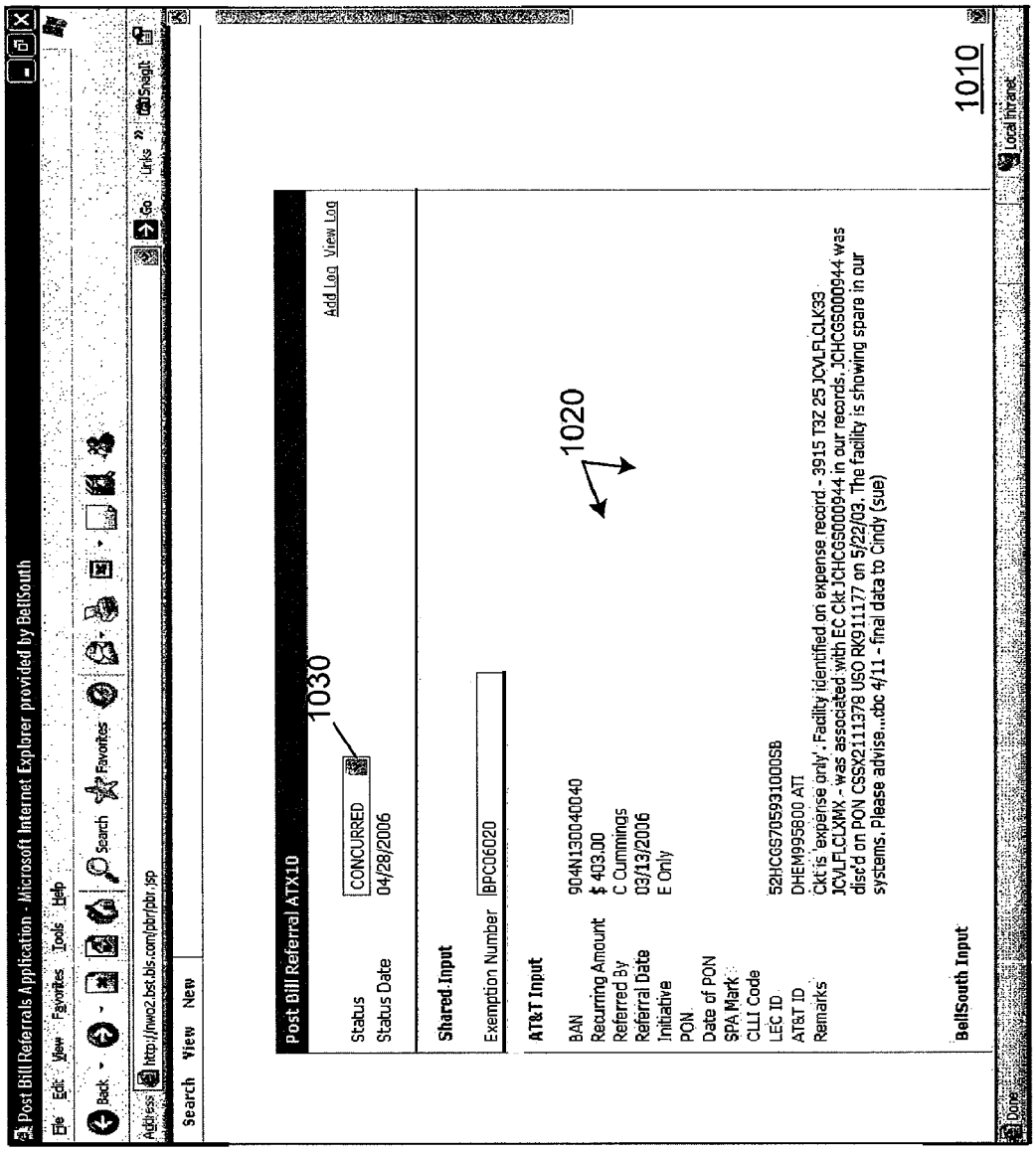

Accordingly, the customer can later review the billing dispute and view the remarks provided by the service provider. In the example of FIG. 10, a portion of a web page 1010 is shown via an interface to the interactive dispute forum system 400 where a user can view remarks and information (which is not displayed in the portion of the page 1010 shown) provided by the service provider and prior information 1020 provided by the service provider. In the present example, the user can select to change the status of the dispute by selecting an appropriate status identifier in dropdown box 1030.

At this point, the customer sending the dispute may be responsible for concurring or not concurring with the resolution of the item. If the customer concurs, the customer can change the status of the item to concurred (as shown in FIG. 10). This stops all system timers, and the disputed item cannot be re-opened, in one embodiment, among others.

If the customer sending the disputed item does not agree with the findings, the customer can change the status of the item to be escalated. At this time, the system timer begins again with a new time period. Once resolved, the disputed item may then be changed to concurred per the directions above. In one embodiment, a representative of the service provider is also provided an option to delete items after concurrence has been reached.

If a customer enters a dispute into a web site interface of the interactive dispute forum system 400, a customer may then go back to web site to check on status of the dispute. When an item is submitted, a system timer starts. During the investigation process the timer changes the status of items by changing appearance of the item to notify a user (either the customer or a service provider representative) of the current status. For example, in one embodiment, the color changes as the period of time that the item has been opened approaches 45 days which is the required resolution standard time frame, in one implementation.

If the representative of the service provider determines to change status of item to close an item based on their findings, then the system timer is automatically stopped. It may be that the service provider determines that the customer is correct in submitting the dispute and issues an order to correct the billing records and/or gives a refund to the customer. Also, it may be that the service provider determines that the customer is incorrect in submitting the dispute and provides reasoning as to why the dispute is incorrect. Upon completion of the investigation, the service provider provides feedback to the customer including adjustment information or reason for denial, order information, and notes as needed.

As previously mentioned, after an item is closed, a customer can then review the findings provided by the service provider via the interactive dispute forum system 400. An option is provided for the user to provide their concurrence with the findings and change the item status from closed to concurrence, if the customer agrees with the findings. If the customer does not agree with the findings of the service provider, the customer can change the status of item from closed to escalated. Change of the status to escalated restarts the system timer for the disputed item and the color code for the item is changed to reflect the new status (e.g., the new escalated status). Also, the date the status changed from closed to escalated may be recorded and displayed on web pages corresponding to the disputed item, in addition to other dates such as the date the item was submitted ("Referral Date") or a date that investigation of the item was opened by the service provider, for example.

Referring back to FIG. 7, indications of different colors may be used to show the different statuses of dispute items. For example, an item displayed in red indicates that the item has exceed a 60 day processing time, while an item displayed in green indicates that the item has exceeded a 45 day processing time. In the figure, the RED and GREEN markings 730, 740 are used since the figure is shown in black and white and not in color. Accordingly, different shades or types of font may also be used to indicate a status of an item.

Figure 7A:
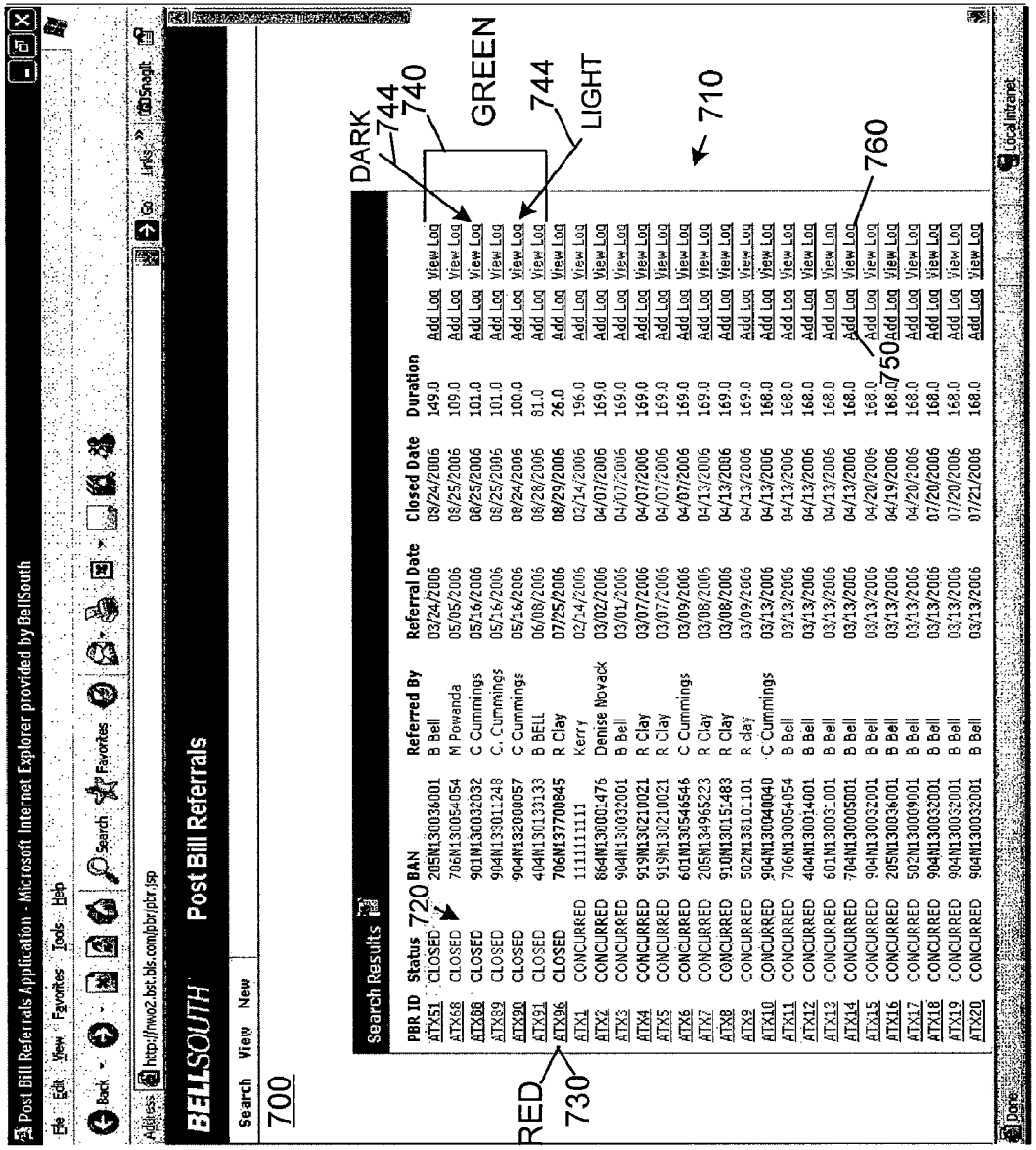
FIG. 7A is a screenshot diagram of an exemplary interface screen to the interactive dispute forum system of FIG. 4 displaying sorted display listings.

In the example of FIG. 7A, a dark or bold shading 742 of an item may be used to indicate that the item has not been viewed, whereas a light shading 744 may be used to indicate that an item has been viewed. Therefore, if an item has a dark green appearance, the fact that the item is green indicates one piece of information and the fact that the item is shaded in a dark manner indicates another piece of information, in one embodiment, among others.

Accordingly, in some embodiments, to indicate that an item has a concurred status, the item may be displayed in a blue font and items having a closed status may be displayed in a purple font.

Further, in some embodiments, a user has the ability to add additional notes about a disputed item via an Add Log button 750. This additional log may help in the investigation of an item or can be used to write and save notes while an item is being processed. The View Log button 760 allows the user to view all log notes entered for a specific item.

Figure 7B:
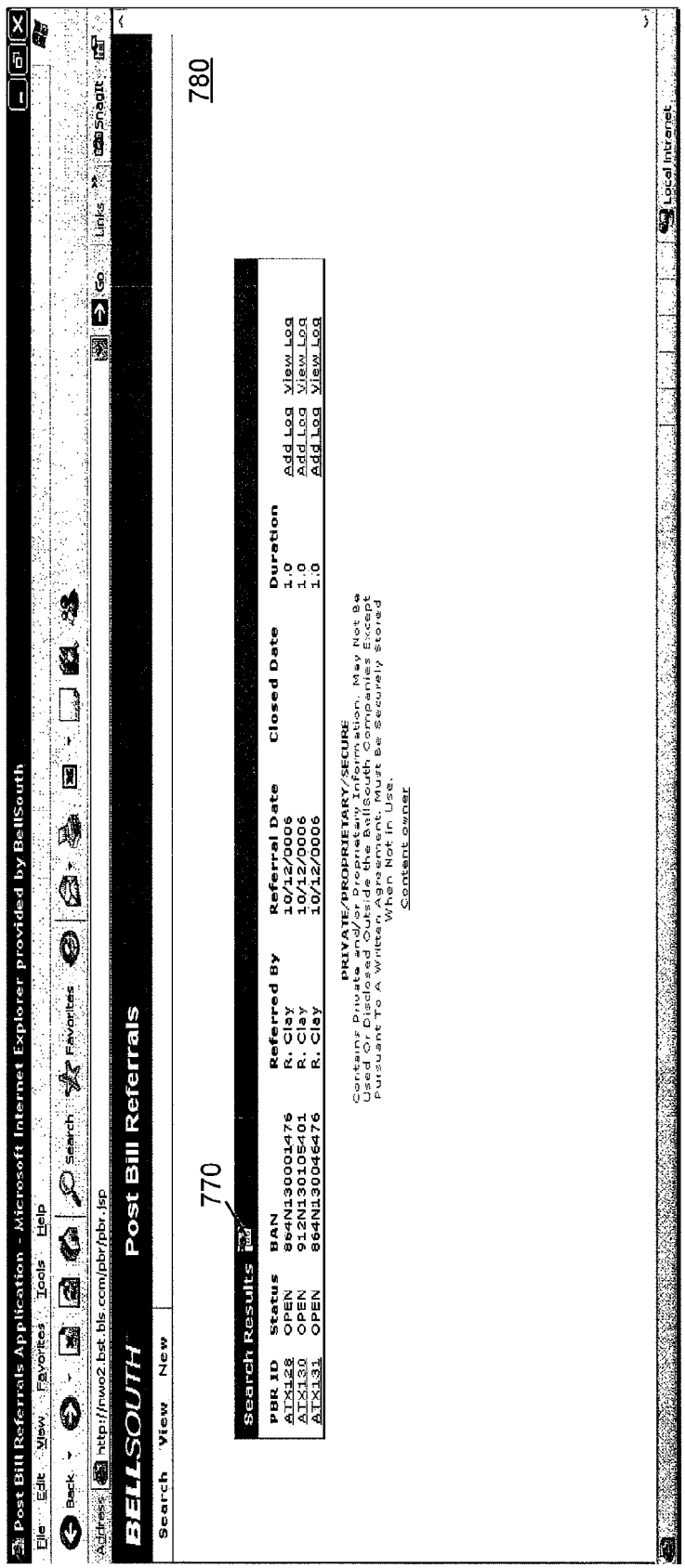
FIG. 7B is a screenshot diagram of an exemplary interface screen to the interactive dispute forum system of FIG. 4 displaying search results.

Further, options may be provided for either the customer or the service provider representative to output a report of information displayed in web pages corresponding to a disputed item as an electronic file, such as a spreadsheet file. In one embodiment, among others, to output a MICROSOFT EXCEL spreadsheet of items having a specific status, an EXCEL icon 770 is provided on the page 780 displaying search results, as shown in FIG. 7B. Upon selection of the icon, a web server 410 sends a web browser on client device 110, 160, 205 launches a locally installed MICROSOFT EXCEL spreadsheet application that can be used to review or save the spreadsheet file, as needed.

Also, the customer can submit new additional information to support their contention of a billing error. In some circumstances, additional information may not be provided. Or, matters may be discussed verbally between representatives of the customer and the service provider.

As an example and not meant to be limiting, disputed items may entail one time charges where a service provider installs a service and the customer does not accept the charge. For example, the customer may not approve of a one-time billing charge, although the service provider may often employ a one time or non-recurring charge in new installations, in addition to monthly recurring charges. As another non-limiting example, a dispute may entail that a customer is being billed for 23 miles of work when the service agreement called for 18 miles of work (e.g., installing 18 miles of telephone line) to be performed. The service provider would then investigate the matter and determine why they thought 18 miles of work was to be performed and the customer thought 23 miles of work was to be performed. If the customer is determined to be correct, the service provider may then adjust the charged mileage for the time period that the customer is disputing and refund that money that is owed to the customer and also correct the customer records. A wide variety of disputes are possible, and the foregoing examples are just a couple.

Figure 11:
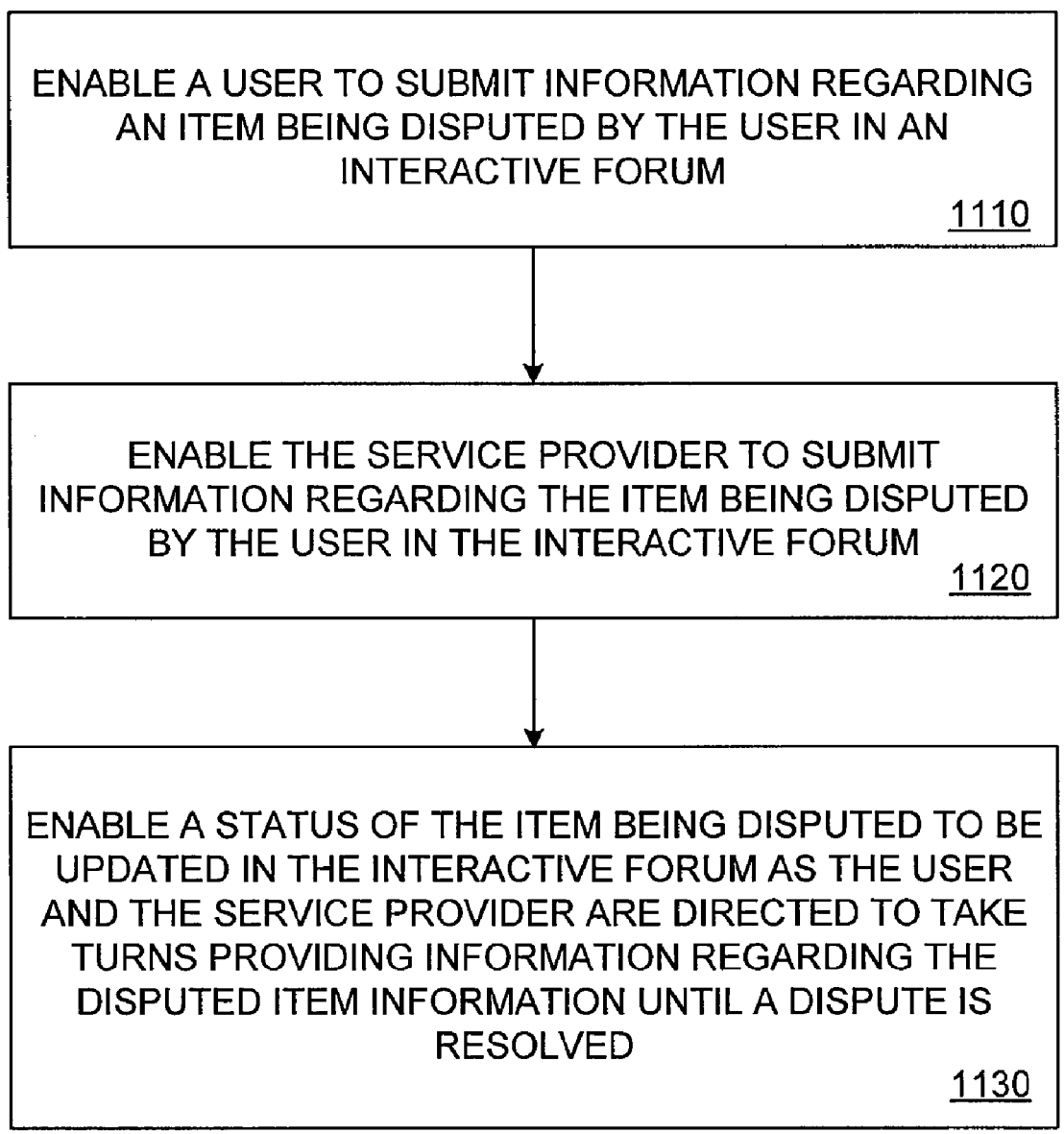
FIG. 11 is a flow chart diagram of an embodiment of a process for handling dispute items within the system of FIG. 1.

Referring now to the flow chart of FIG. 11, one embodiment, among others, of a process for handling disputed items, in accordance with the present disclosure is described. The process includes enabling (1110) a user to submit information regarding an item being disputed by the user in an interactive forum. The item involves a service provided by a service provider for the user, wherein the information submitted by the user is network-accessible by a client machine of the service provider. The process further includes enabling (1120) the service provider to submit information regarding the item being disputed by the user in the interactive forum. The information submitted by the service provider is network-accessible by a client machine of the user. Such a process further includes enabling (1130) a status of the item being disputed to be updated in the interactive forum as the user and the service provider are directed to take turns providing information regarding the disputed item information (e.g., by the interactive dispute forum system 400) until a dispute is resolved. In some embodiments, additional and aforementioned features and/or steps may also be provided.

Figure 12:
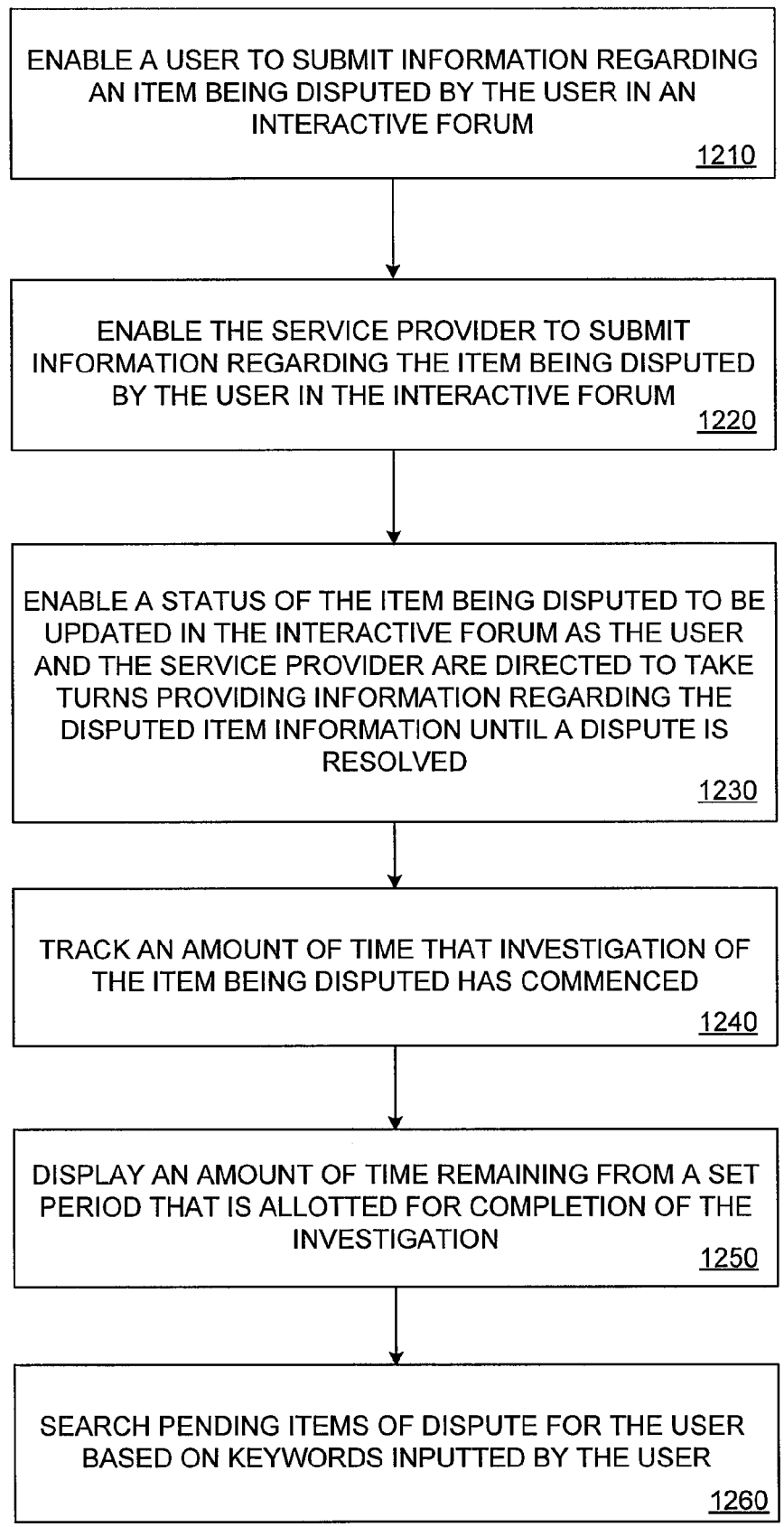
FIG. 12 is a flow chart diagram of an embodiment of a process for handling disputed items within the system of FIG. 1.

For example, FIG. 12 shows another embodiment, among others, of a process for handling disputed items, in accordance with the present disclosure. The process includes enabling (1210) a user to submit information regarding an item being disputed by the user in an interactive forum. The item involves a service provided by a service provider for the user, wherein the information submitted by the user is network-accessible by a client machine of the service provider. The process further includes enabling (1220) the service provider to submit information regarding the item being disputed by the user in the interactive forum. The information submitted by the service provider is network-accessible by a client machine of the user. Such a process further includes enabling (1230) a status of the item being disputed to be updated in the interactive forum as the user and the service provider are directed to take turns providing information regarding the disputed item information (e.g., by the interactive dispute forum system 400) until a dispute is resolved and tracking (1240) an amount of time that investigation of the item being disputed has commenced. An amount of time remaining from a set period that is allotted for completion of the investigation is also displayed (1250). Further, pending items of dispute for the user may be searched (1260) based on keywords inputted by the user.

Any process descriptions or blocks in flow charts should be understood as representing modules, segments, or portions of code which include one or more executable instructions for implementing specific logical functions or steps in the process, and alternate implementations are included within the scope of some embodiments of the present disclosure in which functions may be executed out of order from that shown or discussed, including substantially concurrently or in reverse order, depending on the functionality involved, as would be understood by those reasonably skilled in the art of the present disclosure.

Components of embodiments of the present disclosure can be implemented in hardware, software, firmware, or a combination thereof. In one embodiment, various components are implemented in software or firmware that is stored in a memory and that is executed by a suitable instruction execution system. If implemented in hardware, as in an alternative embodiment, the components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Software components, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. Specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). The scope of the present disclosure includes embodying the functionality of some embodiments in logic embodied in hardware or software-configured mediums.

Conditional language, such as, among others, "can," "could," "might,"or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A method for handling disputed items, comprising:
enabling a user to submit information regarding an item being disputed by the user in an interactive forum, the item involving a service provided by a service provider for the user, wherein the information submitted by the user is network-accessible by a client machine of the service provider;
enabling the service provider to submit information regarding the item being disputed by the user in the interactive forum, wherein the information submitted by the service provider is network-accessible by a client machine of the user;
enabling a status of the item being disputed to be updated in the interactive forum as the user and the service provider are directed to take turns providing information regarding the disputed item information until a dispute is resolved;
enabling the service provider to change the status of the item being disputed to a closed status; and
enabling the user to change the status of the item being disputed to an escalated status from the closed status.

2. The method of claim 1, wherein the status of the item being disputed is indicated by a color code associated with the item.

3. The method of claim 1, further comprising:
tracking an amount of time that investigation of the item being disputed has commenced.

4. The method of claim 3, further comprising:
displaying an amount of time remaining from a set period that is allotted for completion of the investigation.

5. The method of claim 1, further comprising:
searching pending items of dispute for the user based on keywords inputted by the user.

6. The method of claim 1, further comprising:
sorting a list of pending items of dispute for the user based on current statuses of the pending items.

7. The method of claim 1, further comprising:
tracking an amount of time that the item being disputed is in an escalated state.

8. A non-transitory computer readable medium having a computer program for handling disputed items, the program comprising:
enabling a user to submit information regarding an item being disputed by the user in an interactive forum, the item involving a service provided by a service provider for the user, wherein the information submitted by the user is network-accessible by a client machine of the service provider;
enabling the service provider to submit information regarding the item being disputed by the user in the interactive forum, wherein the information submitted by the service provider is network-accessible by a client machine of the user;
enabling a status of the item being disputed to be updated in the interactive forum as the user and the service provider are directed to take turns providing information regarding the disputed item information until a dispute is resolved;
enabling the service provider to change the status of the item being disputed to a closed status; and
enabling the user to change the status of the item being disputed to an escalated status from the closed status.

9. The non-transitory computer readable medium of claim 8, wherein the status of the item being disputed is indicated by a color code associated with the item.

10. The non-transitory computer readable medium of claim 8, the program further comprising:
tracking an amount of time that investigation of the item being disputed has commenced.

11. The non-transitory computer readable medium of claim 10, the program further comprising:
displaying an amount of time remaining from a set period that is allotted for completion of the investigation.

12. The non-transitory computer readable medium of claim 8, the program further comprising:
searching pending items of dispute for the user based on keywords inputted by the user.

13. The non-transitory computer readable medium of claim 8, the program further comprising:
sorting a list of pending items of dispute for the user based on current statuses of the pending items.

14. The non-transitory computer readable medium of claim 8, the program further comprising:
tracking an amount of time that the item being disputed is in an escalated state.

* * * * *